United States Patent
Lee et al.

(10) Patent No.: US 12,347,130 B2
(45) Date of Patent: Jul. 1, 2025

(54) OBJECT POSITIONING METHOD AND OBJECT POSITIONING SYSTEM

(71) Applicant: Coretronic Corporation, Hsin-Chu (TW)

(72) Inventors: Cheng-Hsin Lee, Hsin-Chu (TW); Jia-Hua Lee, Hsin-Chu (TW); Huai-En Wu, Hsin-Chu (TW); Huang-Cheng Chiang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 382 days.

(21) Appl. No.: 17/715,016

(22) Filed: Apr. 6, 2022

(65) Prior Publication Data
US 2022/0327729 A1    Oct. 13, 2022

(30) Foreign Application Priority Data
Apr. 8, 2021    (CN) .......................... 202110375309.9

(51) Int. Cl.
*G06T 7/70*    (2017.01)
*G06N 3/045*    (2023.01)
(Continued)

(52) U.S. Cl.
CPC ............... *G06T 7/70* (2017.01); *G06N 3/045* (2023.01); *G06V 10/46* (2022.01); *G06V 10/757* (2022.01);
(Continued)

(58) Field of Classification Search
CPC .. G06T 7/70; G06T 9/002; G06T 7/73; G06T 2207/10028; G06T 2207/20081;
(Continued)

(56) References Cited

U.S. PATENT DOCUMENTS

| 9,635,346 | B2 | 4/2017 | Iida |
| 10,328,578 | B2 * | 6/2019 | Holz .......................... B66F 9/00 |
| 2015/0003723 | A1 | 1/2015 | Huang et al. |

FOREIGN PATENT DOCUMENTS

| CN | 105139416 | 12/2015 |
| CN | 107507167 | 12/2017 |

(Continued)

OTHER PUBLICATIONS

Robert Varga et al., "Robust Pallet Detection for Automated Logistics Operations", International Conference on Computer Vision Theory and Applications, Jan. 2016, pp. 1-9.
(Continued)

*Primary Examiner* — Stephen R Koziol
*Assistant Examiner* — Michael Kim Maiden
(74) *Attorney, Agent, or Firm* — JCIPRNET

(57) ABSTRACT

An object positioning system and an object positioning method are provided. The object positioning system includes a sensing device, a storage device and a processing device. The sensing device collects point cloud data obtained from a scene including a target object. The processing device inputs surrounding area data centered on a key point and a preset feature descriptor to a neural network to calculate a scene feature descriptor of the scene. The processing device performs feature matching between the scene feature descriptor and the preset feature descriptor, and calculates a position of the target object in an actual space. The invention utilizes the feature extraction capability of the neural network to effectively improve the accuracy and stability of target object identification and positioning.

16 Claims, 2 Drawing Sheets

(51) Int. Cl.
*G06V 10/46* (2022.01)
*G06V 10/75* (2022.01)
*G06V 10/762* (2022.01)
*G06V 10/82* (2022.01)

(52) U.S. Cl.
CPC ............ *G06V 10/762* (2022.01); *G06V 10/82* (2022.01); *G06T 2207/10028* (2013.01)

(58) Field of Classification Search
CPC .... G06V 10/82; G06V 2201/06; G06V 10/74; G06V 10/46; G06V 10/757; G06V 10/762; G06V 20/64; G01S 17/06; G01S 17/42; G06N 3/0464; G06N 3/045; G06N 3/08; G05B 2219/37582; B66F 9/00
See application file for complete search history.

(56) References Cited

FOREIGN PATENT DOCUMENTS

| | | | |
|---|---|---|---|
| CN | 108830902 | | 11/2018 |
| CN | 107218927 | | 8/2019 |
| CN | 110136175 | | 8/2019 |
| CN | 110136175 | A * | 8/2019 |
| CN | 110807461 | A * | 2/2020 ............ G06K 9/3233 |
| CN | 110942515 | A * | 3/2020 ......... G06K 9/00201 |
| CN | 112017226 | | 12/2020 |
| KR | 101095579 | | 12/2011 |
| TW | 201039248 | | 11/2010 |

OTHER PUBLICATIONS

Varga Robert et al., "Vision-based Autonomous Load Handling for Automated Guided Vehicles", 2014 IEEE 10th International Conference on Intelligent Computer Communication and Processing (ICCP), Sep. 2014, pp. 1-7.

Tianjian Li et al., "Cargo pallets real-time 3D positioning method based on computer vision", 7th International Symposium on Test Automation and Instrumentation(ISTAI 2018), Oct. 2018, pp. 1-5.

Tianjian Li et al., "Application of convolution neural network object detection algorithm in logistics warehouse", 7th International Symposium on Test Automation and Instrumentation(ISTAI 2018), Oct. 2018, pp. 1-6.

Junhao Xiao et al., "Pallet recognition and localization using an RGB-D camera", International Journal of Advanced Robotic Systems, Nov.-Dec. 2017, pp. 1-10.

Benjamin Molter et al., "Real-time Pallet Localization with 3D Camera Technology for Forklifts in Logistic Environments", 2018 IEEE International Conference on Service Operations and Logistics, and Informatics (SOLI), Jul. 31-Aug. 2, 2018, pp. 1-6.

Zan Gojcic et al., "The Perfect Match: 3D Point Cloud Matching with Smoothed Densities", 2019 IEEE/CVF Conference on Computer Vision and Pattern Recognition (CVPR), Jun. 2019, pp. 5545-5554.

Andy Zeng et al., " 3DMatch: Learning Local Geometric Descriptors from RGB-D Reconstructions", 2017 IEEE Conference on Computer Vision and Pattern Recognition (CVPR), Jul. 2017, pp. 1-12.

Yulan Guo et al., "3D Object Recognition in Cluttered Scenes with Local Surface Features: A Survey", IEEE Transactions on Pattern Analysis and Machine Intelligence, vol. 36, Issue 11, Nov. 2014, pp. 2270-2287.

"Office Action of China Counterpart Application", issued on Apr. 11, 2024, p. 1-p. 8.

Zhong; Yueqi, "Development and Application of Deep Learning in 3D Models", Principles, Techniques and Applications of Artificial Intelligence, Sep. 2020, with English translation thereof, pp. 1-12, Chapter 14.

"Office Action of China Counterpart Application", issued on Nov. 28, 2024, p. 1-p. 8.

* cited by examiner

OBJECT POSITIONING METHOD AND OBJECT POSITIONING SYSTEM

CROSS-REFERENCE TO RELATED APPLICATION

This application claims the priority benefit of China application serial no. 202110375309.9, filed on Apr. 8, 2021. The entirety of the above-mentioned patent application is hereby incorporated by reference herein and made a part of this specification.

BACKGROUND

Technical Field

The disclosure relates to an electronic device, and particularly relates to an object positioning method and an object positioning system.

Description of Related Art

As factory automation continues to develop, transportation of goods has also become an important part of automation. In view of handling of large goods, forklifts are the primary target for automation. To enable the automatic handling forklift to move goods smoothly, in addition to a function of autonomous navigation, in case that a pallet is skewed, it will be more flexible if a function of goods identification is provided to automatically adjust a moving process of the forklift. Also, the goods transported by the forklift are generally placed on the pallet. Therefore, pallet identification has also become an important technique in the development of automatic handling forklifts.

Pallet identification technology is divided into two parts including pallet identification and pallet positioning. The pallet identification is to find the pallet in an uncertain environment, and the pallet positioning is to associate a spatial position of the pallet to the forklift in order to carry goods smoothly. General cameras provide the function of planar imaging and obtain information of a two-dimensional (2D) space, and conventional machine vision identification methods are also based on a 2D plane. However, the pallet identification requires positioning in addition to identification, and if a single camera is used for positioning, it is likely that significant errors may occur. Dual cameras rely on a parallax and geometric conditions of the two cameras to calculate a position of the object, but the amount of calculation is relatively large.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

The invention is directed to an object positioning method and an object positioning system, which are adapted to improve identification and positioning accuracy of a target object.

Other objectives and advantages of the invention may be further illustrated by the technical features broadly embodied and described as follows.

In order to achieve one or a portion of or all of the objectives or other objectives, an embodiment of the invention provides an object positioning method, which includes following steps. Point cloud data obtained from a scene including a target object is received by a sensing device. A key point is extracted from the point cloud data by a processing device. Surrounding area data centered on the key point and a preset feature descriptor of the target object are input to a neural network by the processing device to calculate a scene feature descriptor of the scene. Feature matching is performed between the scene feature descriptor and the preset feature descriptor by the processing device. A position of the target object in an actual space is calculated by the processing device.

The invention further provides an object positioning system including a sensing device, a storage device and a processing device. The sensing device is configured to collect point cloud data obtained from a scene including a target object. The storage device is configured to store a preset feature descriptor of the target object. The processing device is coupled to the storage device and the sensing device, and is configured to receive the point cloud data and extract a key point from the point cloud data, and input surrounding area data centered on the key point and the preset feature descriptor to a neural network to calculate a scene feature descriptor of the scene, and perform feature matching between the scene feature descriptor and the preset feature descriptor, and calculate a position of the target object in an actual space.

Based on the above description, the embodiment of the invention extracts the key point from the three-dimensional (3D) point cloud data, and inputs the surrounding area data centered on the key point and the preset feature descriptor of the target object into the neural network to calculate the scene feature descriptor of the scene, performs feature matching between the scene feature descriptor and the preset feature descriptor, and calculates the position of the target object in the actual space. In this way, by inputting the preset feature descriptor and the surrounding area data including the key point extracted from the 3D point cloud data into the neural network to calculate the scene feature descriptor of the scene, the feature extraction ability of the neural network is used to effectively improve accuracy and stability of target object identification and positioning.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

It is to be understood that other embodiment may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
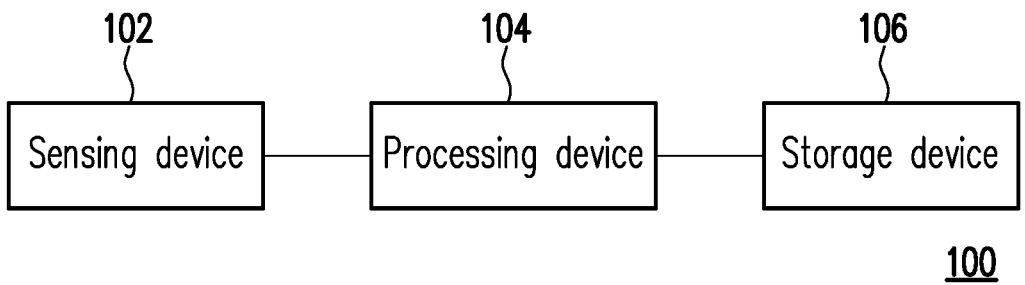
FIG. 1 is a schematic diagram of an object positioning system according to an embodiment of the invention.

FIG. 1 is a schematic diagram of an object positioning system according to an embodiment of the invention. Referring to FIG. 1, the object positioning system 100 may include a sensing device 102, a processing device 104 and a storage device 106, and the processing device 104 is coupled to the sensing device 102 and the storage device 106. The sensing device 102 may collect point cloud data obtained from a scene including a target object. To represent spatial information by using the point cloud data may facilitate extracting features of the target object through spatial geometry, and then the features are processed to confirm whether it is the target object. In the embodiment, the sensing device 102 may be, for example, a time-of-flight (TOF) camera, which may use infrared or laser as a light source, and calculate a distance to an object by calculating a flight time of light reflected by the object, so as to derive 3D coordinates to generate 3D point cloud data of the scene including the target object, where the target object may be, for example, a pallet, which is not limited by the invention. The storage device 106 may be, for example, any type of a fixed or removable random access memory (RAM), a read-only memory (ROM), a flash memory, a hard drive, or other similar devices or a combination of these devices that may store a preset feature descriptor of the target object, where the preset feature descriptor is obtained by performing key point and descriptor extraction from a standard template. The standard template is a pre-made pallet template. In order to reduce a calculation time, coordinate conversion and key point and descriptor extraction are first performed on the pallet template for storage. In the embodiment, the key point may be selected as a feature point in the point cloud data that has low data volume, high stability and distinguishability and is not easy to be confused with other feature points, for example, a corner in the point cloud data may be detected as the key point. The key point may be extracted by, for example, uniform sampling, but the invention is not limited thereto, and in other embodiments, a scale invariant feature transform (SIFT) algorithm, a Harris corner detection (Harris) algorithm or a normal aligned radial feature (NARF) algorithm may also be used to extract the key point. The descriptor may be obtained by calculating a feature description of a surrounding area data centered on the key point. In an example where the target object is a pallet, a TOF camera may be used to obtain clear and complete point cloud data at a preset distance (for example, 1 meter) from the pallet, and a front part of the pallet may be taken as a standard template after filtering out noises.

The processing device 104 may be a general-purpose processor, a special-purpose processor, a conventional processor, a digital signal processor, a plurality of microprocessors, one or more microprocessors combined with a digital signal processor core, a controller, a microcontroller, an application specific integrated circuit (ASIC), a field programmable gate array (FPGA), any other types of integrated circuit, state machine, or processor based on advanced RISC machine (ARM). The processing device 104 may receive the point cloud data provided by the sensing device 102, extract a key point from the point cloud data, and input surrounding area data centered on the key point and a preset feature descriptor into a trained neural network to calculate a scene feature descriptor of the scene including the target object. In some embodiments, in order to reduce an amount of calculation, the processing device 104 may first remove a part of the point cloud data. For example, the processing device 104 may first divide the point cloud data according to a plane where the target object is located (for example, the plane may be a floor plane or a shelf plane where the pallet is placed), and a Euclidean clustering algorithm is used to divide the point cloud data, i.e. the point cloud data is divided into multiple point groups based on spatial distances. The processing device 104 may choose to only perform key point extraction on N largest point groups, so as to reduce the amount of calculation and prevent false detection and noise interference, where N is a positive integer.

Further, due to directivity of spatial point cloud, when calculating the scene feature descriptor, local reference coordinates of the key point may be calculated first to perform coordinate conversion to ensure that the scene feature descriptor calculated each time is the same. In addition, in some embodiments, the surrounding area data may be first smoothed by Gaussian distribution to eliminate noise interference and avoid affecting the correctness of the calculation result of the scene feature descriptor.

In the embodiment, the neural network may be, for example, a siamese neural network, and the siamese neural network may be, for example, a structure including two convolutional neural networks (CNN), but the invention is not limited thereto. In the embodiment, a 3DMatch database may be used to train the neural network, which is RGBD (RGB-Depth) indoor scene data, and each scene is composed of many scattered 3D point clouds, and the adjacent point clouds have overlapped parts. When the siamese neural network is used for training, the key point and points in a surrounding area of the key point may be used as an input together. A training framework is to make the loss of the same key point as small as possible, and make the loss of the key points farther away as greater as possible. In addition, pallet data may also be used for training.

The processing device 104 may perform feature matching between the calculated scene feature descriptor and the preset feature descriptor. For example, the preset feature descriptor may be compared with the scene feature descriptor of each point group to determine whether each point group has the matched scene feature descriptor. For example, it may be determined whether similarity between the preset feature descriptor and the scene feature descriptor is higher than a threshold, and if yes, the matching is successful. After the matching of the feature descriptors is completed, the processing device 104 may perform coordinate conversion according to the matching result to calculate a position of the target object in an actual space. In some embodiments, after the matching of the feature descriptors is completed, the processing device 104 may remove mismatched exception points, and then perform coordinate conversion to avoid the mismatched exception points from affecting correctness of the calculation of the position of the target object in the actual space. In some embodiments, the processing device 104 controls a forklift to carry the pallet according to the calculated position of the target object in the actual space, or transmits the position of the target object in the actual space to the forklift, so that the forklift may carry the pallet accordingly.

Figure 2:
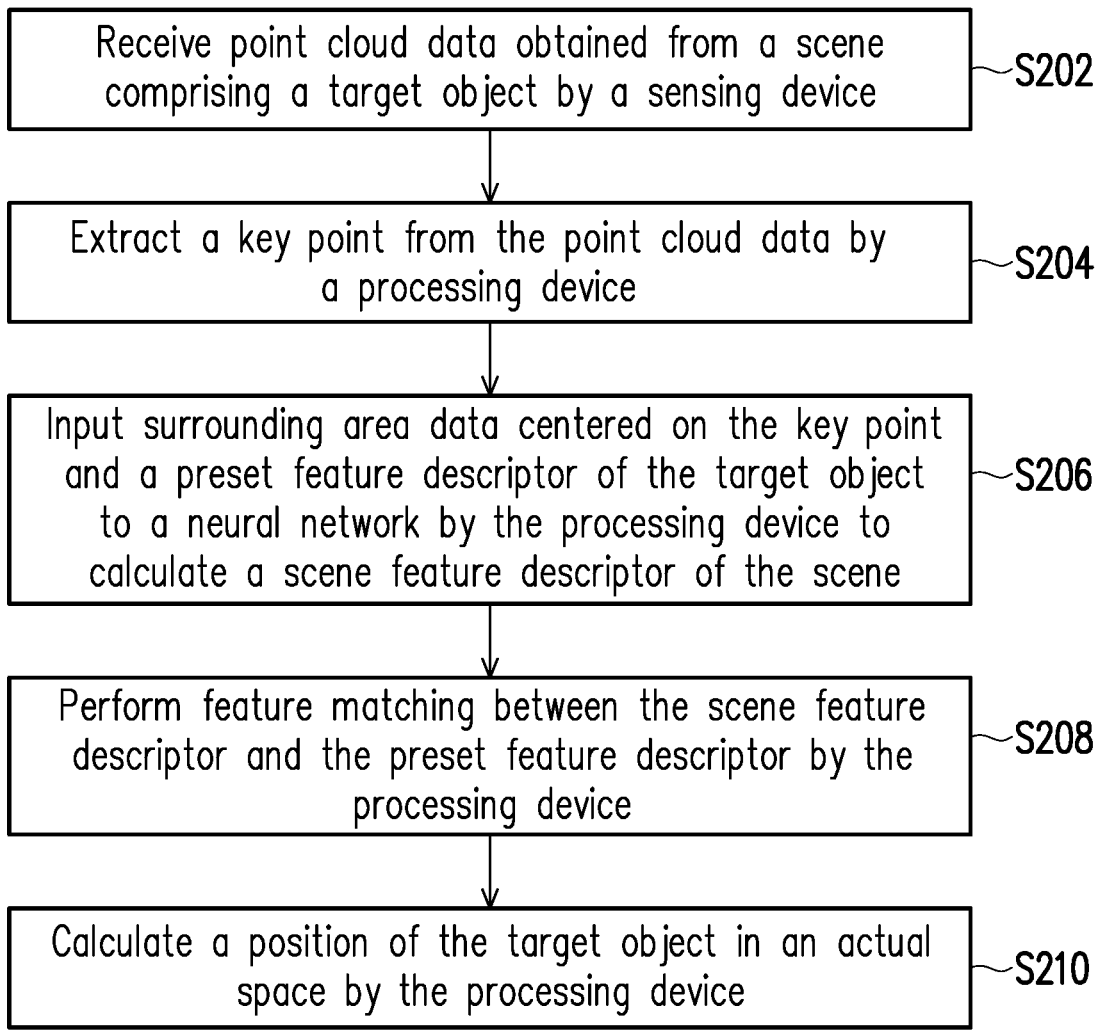
FIG. 2 is a flowchart of an object positioning method according to an embodiment of the invention.

FIG. 2 is a flowchart of an object positioning method according to an embodiment of the invention. Referring to FIG. 1 and FIG. 2 at the same time, based on the above embodiment, it is known that the object positioning method may at least include the following steps. First, the sensing device 102 receives the point cloud data obtained from the scene including the target object (step S202), but the invention is not limited thereto. Then, the processing device 104 extracts the key point from the point cloud data (step S204), and a method of extracting the key point may be, for example, uniform sampling, but the invention is not limited thereto. Then, the processing device 104 inputs the surrounding area data centered on the key point and the preset feature descriptor of the target object to the neural network to calculate the scene feature descriptor of the scene (step S206), where the neural network may be, for example, a siamese neural network, which may be a framework including two convolutional neural networks, but the invention is not limited thereto. Then, the processing device 104 performs feature matching between the scene feature descriptor and the preset feature descriptor (step S208). Finally, the processing device 104 is used to calculate the position of the target object in the actual space (step S210). In some embodiments, the mismatched exception points may be removed first, and then the position of the target object in the actual space is calculated, so as to prevent the mismatched exception points from affecting the correctness of the calculation of the position of the target object in the actual space.

Figure 3:
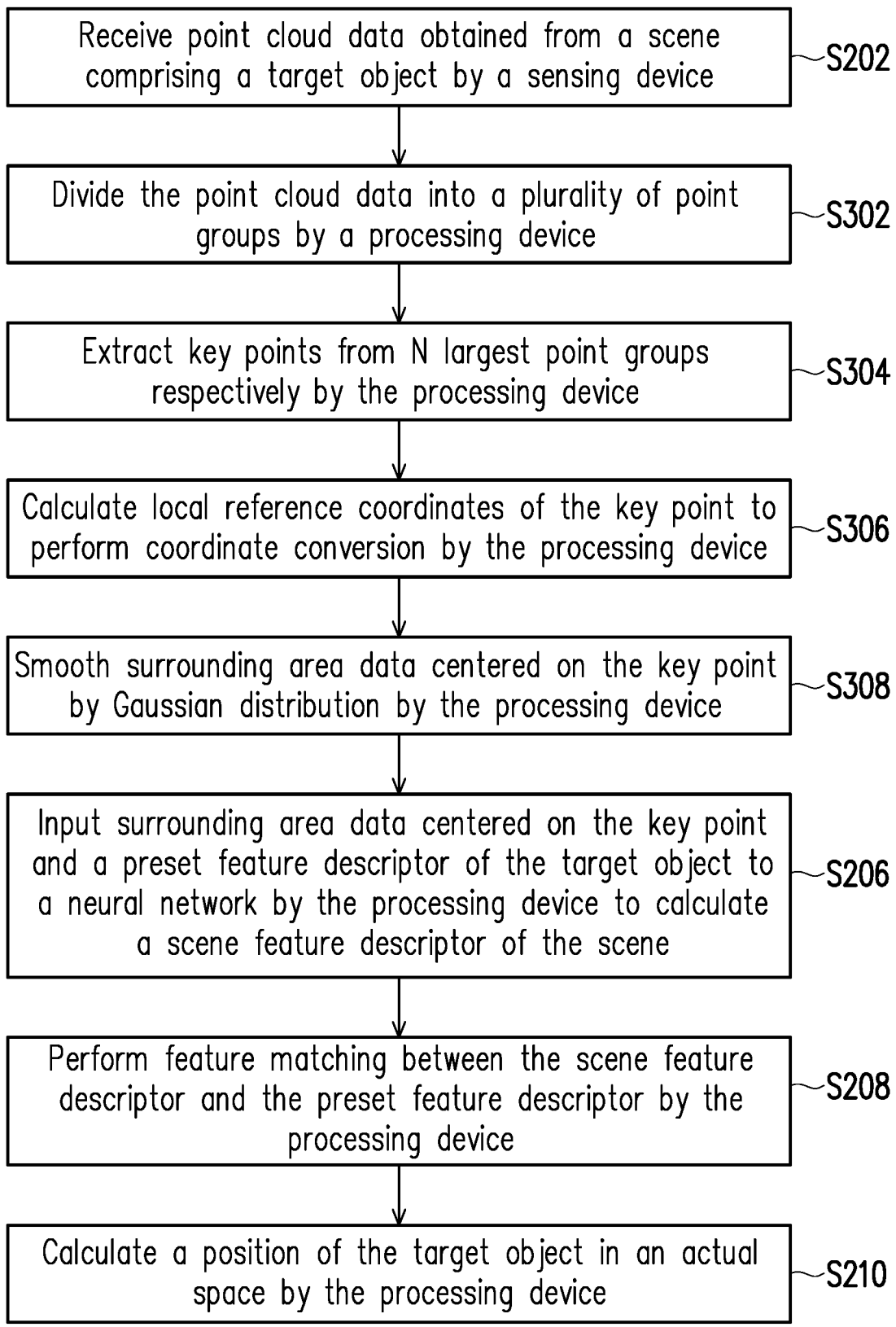
FIG. 3 is a flowchart of an object positioning method according to another embodiment of the invention.

FIG. 3 is a flowchart of an object positioning method according to another embodiment of the invention. A difference between the embodiment and the embodiment in FIG. 2 is that after step S202, the processing device 104 divides the point cloud data into a plurality of point groups (step S302). The method of dividing the point cloud data is, for example, to perform dividing based on a plane where the target object is located, and perform the dividing according to a Euclidean clustering method, but the invention is not limited thereto. Then, key points are extracted from N largest point groups respectively (step S304), where N is a positive integer. In this way, the amount of calculation is reduced and false detection and noise interference are prevented. Thereafter, the processing device 104 calculates the local reference coordinates of the key point to perform coordinate conversion (step S306), which may ensure that the scene feature descriptors calculated each time are the same. Then, the processing device 104 smoothes the surrounding area data by Gaussian distribution (step S308) to further eliminate noise interference, and then enters step S206. Since steps S206 to S210 have been described in the embodiment in FIG. 2, details thereof are not repeated.

In summary, the embodiment of the invention extracts the key point from the 3D point cloud data, and inputs the surrounding area data centered on the key point and the preset feature descriptor of the target object into the neural network to calculate the scene feature descriptor of the scene, performs feature matching between the scene feature descriptor and the preset feature descriptor, and calculates the position of the target object in the actual space. In this way, by inputting the preset feature descriptor and the surrounding area data including the key point extracted from the 3D point cloud data into the neural network to calculate the scene feature descriptor of the scene, the feature extraction ability of the neural network is used to effectively improve accuracy and stability of target object identification and positioning. In some embodiments, the point cloud data may also be divided according to the plane where the target object is located and the Euclidean clustering algorithm. By selecting only the larger point groups to extract the key points, the amount of calculation is reduced and false detection and noise interference are prevented.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. An object positioning method, comprising:
   receiving 3D point cloud data obtained from a scene comprising a target object by a sensing device;
   extracting a key point from the 3D point cloud data by a processing device;
   inputting surrounding area data centered on the key point and a preset feature descriptor of the target object to a neural network by the processing device to calculate a scene feature descriptor of the scene, wherein the preset feature descriptor is obtained from a 3D standard template of the target object, and the neural network is trained by a database including scenes composed of 3D point clouds;

performing feature matching between the scene feature descriptor and the preset feature descriptor by the processing device; and calculating a position of the target object in an actual space by the processing device.

2. The object positioning method as claimed in claim 1, further comprising:

removing mismatched exception points.

3. The object positioning method as claimed in claim 1, further comprising:

dividing the 3D point cloud data into a plurality of point groups, and respectively extracting the key point from N largest point groups, wherein N is a positive integer.

4. The object positioning method as claimed in claim 3, further comprising:

dividing the 3D point cloud data according to a plane where the target object is located.

5. The object positioning method as claimed in claim 3, further comprising:

dividing the 3D point cloud data by a Euclidean clustering method.

6. The object positioning method as claimed in claim 1, further comprising:

calculating local reference coordinates of the key point to perform coordinate conversion.

7. The object positioning method as claimed in claim 1, further comprising:

smoothing the surrounding area data by Gaussian distribution.

8. The object positioning method as claimed in claim 1, wherein the neural network is a siamese neural network.

9. An object positioning system, comprising a sensing device, a storage device and a processing device, wherein the sensing device is configured to collect 3D point cloud data obtained from a scene comprising a target object, the storage device is configured to store a preset feature descriptor of the target object, and the processing device is coupled to the storage device and the sensing device, and is configured to receive the 3D point cloud data and extract a key point from the 3D point cloud data, input surrounding area data centered on the key point and the preset feature descriptor to a neural network to calculate a scene feature descriptor of the scene, perform feature matching between the scene feature descriptor and the preset feature descriptor, and calculate a position of the target object in an actual space, wherein the preset feature descriptor is obtained from a 3D standard template of the target object, and the neural network is trained by a database including scenes composed of 3D point clouds.

10. The object positioning system as claimed in claim 9, wherein the processing device further removes mismatched exception points.

11. The object positioning system as claimed in claim 9, wherein the processing device further divides the 3D point cloud data into a plurality of point groups, and respectively extracts the key point from N largest point groups, wherein N is a positive integer.

12. The object positioning system as claimed in claim 11, wherein the processing device divides the 3D point cloud data according to a plane where the target object is located.

13. The object positioning system as claimed in claim 11, wherein the processing device divides the 3D point cloud data by a Euclidean clustering method.

14. The object positioning system as claimed in claim 9, wherein the processing device further calculates local reference coordinates of the key point to perform coordinate conversion.

15. The object positioning system as claimed in claim 9, wherein the processing device further smoothes the surrounding area data by Gaussian distribution.

16. The object positioning system as claimed in claim 9, wherein the neural network is a siamese neural network.

\* \* \* \* \*